US008217530B2

(12) United States Patent
Lu et al.

(10) Patent No.: US 8,217,530 B2
(45) Date of Patent: Jul. 10, 2012

(54) SYSTEM FOR MANAGING POWER BASED ON CURRENT MONITORING

(75) Inventors: Chun Lu, San Jose, CA (US); Luyang Luo, Chengdu (CN)

(73) Assignee: O2Micro, Inc, Santa Clara, CA (US)

( * ) Notice: Subject to any disclaimer, the term of this patent is extended or adjusted under 35 U.S.C. 154(b) by 417 days.

(21) Appl. No.: 12/495,758

(22) Filed: Jun. 30, 2009

(65) Prior Publication Data

US 2010/0327658 A1 Dec. 30, 2010

(51) Int. Cl.
*H02J 1/10* (2006.01)
*H02J 7/34* (2006.01)

(52) U.S. Cl. ................................ 307/52; 307/44; 307/45

(58) Field of Classification Search .................... 307/44, 307/45, 52
See application file for complete search history.

(56) References Cited

U.S. PATENT DOCUMENTS 5,616,968 A 4/1997 Fujii et al.
5,892,393 A 4/1999 Yamashita
6,879,134 B2 4/2005 Bucur et al.
6,977,448 B2 * 12/2005 Kanouda et al. ................ 307/66
7,952,231 B1 * 5/2011 Zansky et al. .................. 307/59
2003/0015875 A1 1/2003 Fukaya
2004/0145348 A1 7/2004 Bucur et al.
2006/0232241 A1 10/2006 Lu et al.
2007/0029799 A1 2/2007 Shimizu et al.
2008/0100243 A1 5/2008 Kurosawa et al.

FOREIGN PATENT DOCUMENTS

CN 1127949 A 7/1996
CN 1578045 A 2/2005
CN 1846338 A 10/2006
CN 101059693 A 10/2007
CN 101207301 A 6/2008
CN 201238211 Y 5/2009
JP 59-164452 U 11/1984
JP 5-95626 A 4/1993
JP 2002-84675 A 3/2002

* cited by examiner

*Primary Examiner* — Rexford Barnie
*Assistant Examiner* — Dru Parries

(57) ABSTRACT

A system includes a power bus and a circuit. The power bus delivers power from a first power source to an output node. The circuit monitors a current flowing through the power bus and provides power from a second power source to the output node based on an amount of the current, and maintains a voltage level of the output node in a predetermined range.

18 Claims, 3 Drawing Sheets

SYSTEM FOR MANAGING POWER BASED ON CURRENT MONITORING

BACKGROUND

Some electronic circuits impose an upper limit on a current that may be delivered to a load with the purpose of protecting the circuit or the load. For example, a universal serial bus (USB) has an upper current limit of 100 mA when it operates in a low power mode, and has an upper current limit of 500 mA when it operates in a high power mode.

FIG. 1 illustrates a conventional current limit circuit 100. The current limit circuit 100 includes a controller 116, a converter 120, and a switch 110, such as a metal oxide semiconductor field effect transistor (MOSFET). An input power source $V_{IN}$ is coupled to a load 102 through an output node $V_{SYS}$ via the switch 110. The controller 116 is coupled to the switch 110 and the output node $V_{SYS}$ to monitor a voltage at the output node $V_{SYS}$. The input power source $V_{IN}$ is also coupled to a battery 104 at the node $V_{SYS}$ to charge the battery 104. A current flowing through the switch 110 can increase as a power demand of the load 102 increases. By monitoring the voltage at the output node $V_{SYS}$, once the current flowing through the switch 110 reaches a predetermined upper current limit, the switch 110 operates in a linear mode to limit the current flowing through the switch 110. If the power demand of the load 102 keeps increasing, the input power source $V_{IN}$ alone may not provide sufficient power to the load 102. Consequently, the converter 120 can provide extra power from the battery 104 to the load 102.

However, by operating the switch 110 in the linear mode, it causes a thermal problem and extra power consumption.

SUMMARY

A system includes a power bus and a circuit. The power bus delivers power from a first power source to an output node. The circuit monitors a current flowing through the power bus and provides power from a second power source to the output node based on an amount of the current, and maintains a voltage level of the output node in a predetermined range.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

According to one embodiment of present invention, a system includes a first power source and a second power source. The first power source and the second power source are operable for powering a load coupled at an output node of the system. The system can control the current from the first power source to the load within a predetermined range, e.g., below an upper current limit. The system can also maintain a voltage at the output node within a predetermined range. Advantageously, instead of operating a switch in the linear mode to limit the current, the system provides power from a second power source to the load when the current from the first power source exceeds a threshold. In other words, the first power source and the second power source power the load simultaneously when the current from the power source exceeds the threshold. Moreover, the system can adjust power from the second power source according to the current from the first power source. Thus, the current from the first power source can be maintained below the upper current limit. As such, power consumption and the thermal problem caused by the switch working in the linear mode can be avoided.

Figure 1:
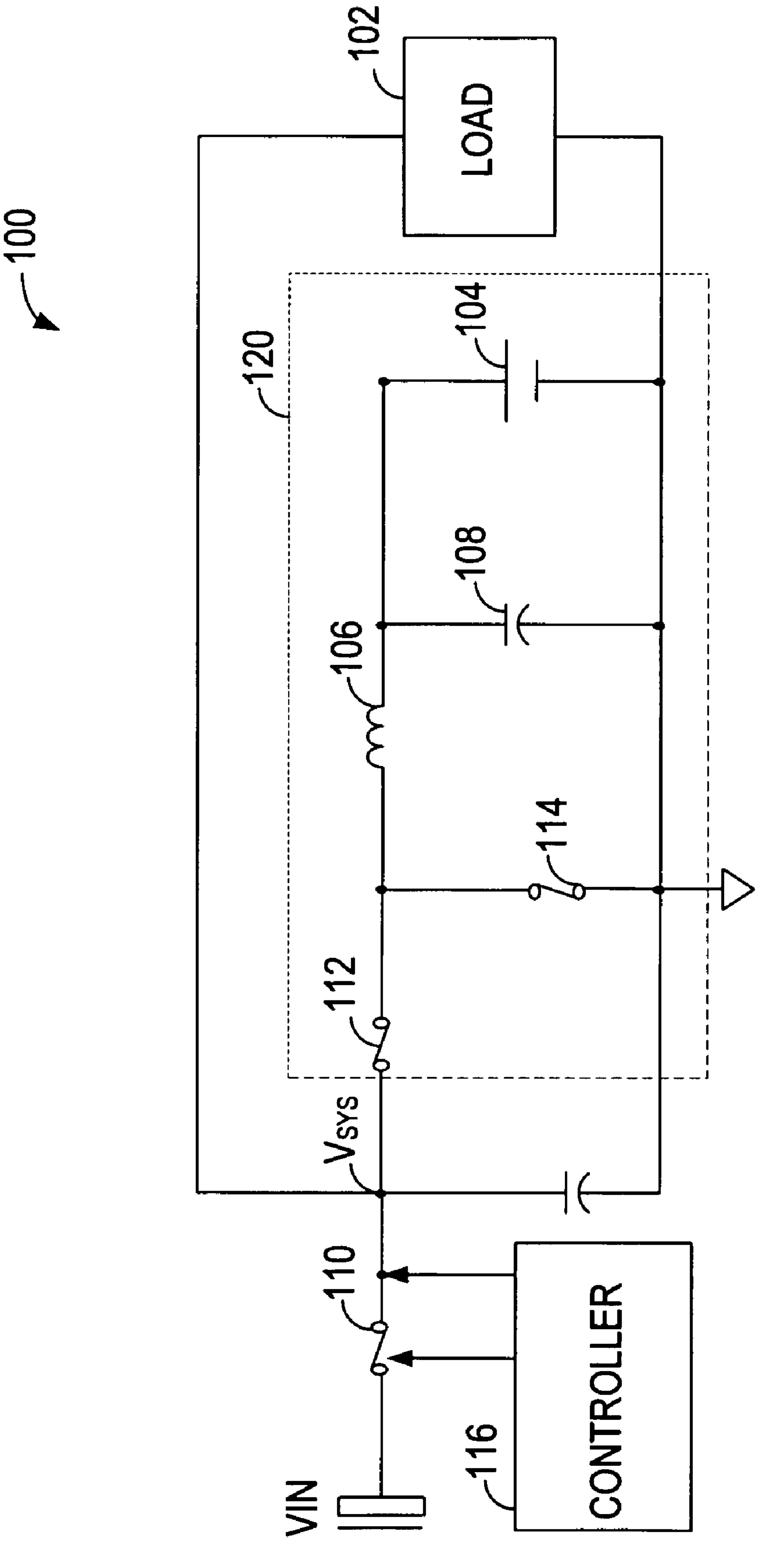
FIG. 1 shows a diagram of a conventional current limit circuit.
Figure 2:
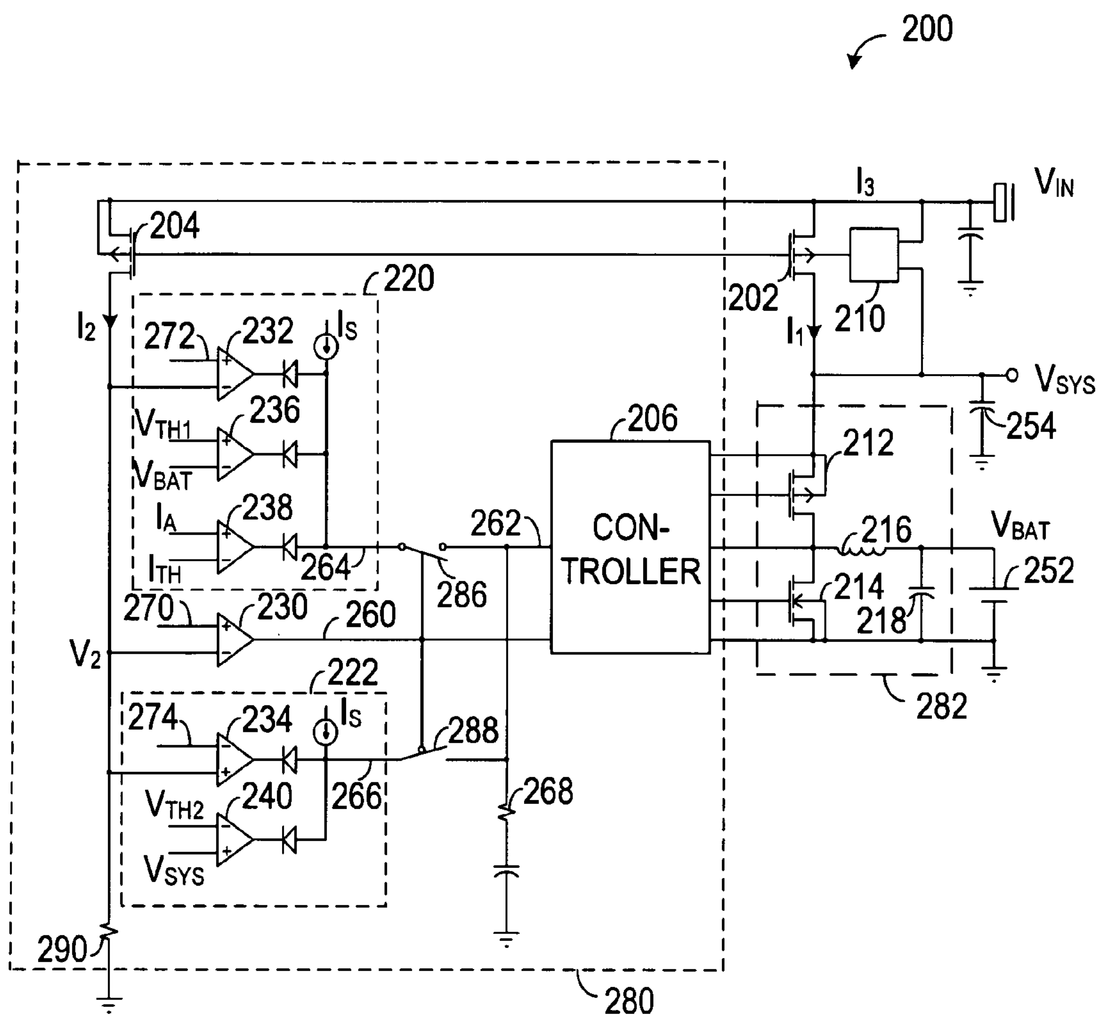
FIG. 2 shows a diagram of a current limit circuit, in accordance with one embodiment of the present invention.

FIG. 2 shows a diagram of a current limit circuit 200, in accordance with one embodiment of the present invention. The current limit circuit 200 includes a first power source, e.g., a power source $V_{IN}$, and a second power source, e.g., a battery 252. The power source $V_{IN}$ and the battery 252 can power the load 254. In one embodiment, either the power source $V_{IN}$ or the battery 252 powers the load 254. In another embodiment, both power source $V_{IN}$ and battery 252 can power the load 254 simultaneously. In one embodiment, the power source $V_{IN}$ can charge the battery 254.

A power bus including a switch 202, is used to deliver power from the power source $V_{IN}$ to an output node $V_{SYS}$. In one embodiment, the load 254 is coupled to the output node $V_{SYS}$. The current $I_1$ flowing through the switch 202 can vary in accordance with the power demand of the load 254. For example, if the power demand of the load 254 increases, the current $I_1$ can be increased accordingly in order to satisfy the power demand of the load 254.

The current limit circuit 200 can monitor the current $I_1$ flowing through the switch 202. The current limit circuit 200 is operable for providing power from the battery 252, to the output node $V_{SYS}$ based on the amount of the current $I_1$, e.g., when the current $I_1$ reaches or exceeds a predetermined threshold. By providing an extra current from the battery 252 to the load 254, the current $I_1$ flowing through the switch 202 can be maintained below a predetermined threshold.

In one embodiment, the current limit circuit 200 includes a current control block 280 and a converter 282. The current control block 280 coupled to the switch 202 and the output node $V_{sys}$ monitors the current $I_1$ flowing through the switch 202 and compares the current $I_1$ with a first threshold 270. The current control block 280 controls the converter 282. The converter 282 can selectively operate in a first mode or a second mode. In the first mode, the converter 282 receives power from the power source $V_{IN}$ and generates proper power to charge the battery 252. In the second mode, the converter 282 provides power from the battery 252 to the load 254 via the output node $V_{sys}$. Advantageously, the converter 282 operates in the second mode when the current $I_1$ reaches or exceeds the first threshold 270, in one embodiment. Thus, in the second mode, both power source $V_{IN}$ and battery 252 power the load 254 simultaneously. As a result, the current $I_1$ can be maintained below an upper current limit.

Moreover, the voltage level of the output node $V_{SYS}$ can be maintained in a predetermined range. The switch 202 performs in the normal switch mode (fully on or fully off) instead of the linear mode. Hence, the thermal problem and the extra power consumption caused by the switch 110 in the conventional current limit circuit 100 can be avoided.

In one embodiment, the switch 202 is a p-channel MOSFET, and a selector 210 compares the voltage levels between the power source $V_{IN}$ and the output node $V_{SYS}$ and applies a higher voltage to the bulk of the p-MOSFET 202.

In one embodiment, the current control block 280 includes a switch 204, a comparator 230, control blocks 220 and 222, and a controller 206. In one embodiment, the switch 204 and the switch 202 form a current mirror. The current $I_2$ flowing through the switch 204 is proportional to the current $I_1$ flowing through the switch 202. Furthermore, a resistor 290 converts the current $I_2$ to a voltage $V_2$ indicative of the current $I_1$.

The comparator 230 can be used to compare the voltage signal $V_2$ with the first threshold 270 and output a mode signal 260 to selectively enable the first control block 220 or the second control block 222 to control the converter 282. More specifically, the mode signal 260 turns on a switch 286 to enable the control block 220 or turns on a switch 288 to enable the control block 222. In one embodiment, the control block 220 is enabled to control the converter 282 in the first mode, and the second control block 222 is enabled to control the converter 282 in the second mode.

In one embodiment, when the voltage $V_2$ is less than the first threshold 270, the switch 286 is switched on. Thus, the control block 220 is enabled based on the mode signal 260. As such, the converter 282 in the first mode receives the power from the power source $V_{IN}$ and generates proper power to charge the battery 252.

In one embodiment, when the voltage $V_2$ is greater than the first threshold 270, the switch 288 is switched on. Thus, the control block 222 is enabled based on the mode signal 260. As such, the converter 282 in the second mode provides the power from the battery 252 to the load 254 via the output node $V_{SYS}$.

In one embodiment, when the control block 220 is enabled, a resistor 268 converts a current signal 264 generated by the control block 220 to a control signal 262 to control the converter 282. The mode signal 260 controls the converter 282 to operate in the first mode. In the first mode, the power source $V_{IN}$ charges the battery 252. Meanwhile, the power source $V_{IN}$ can also power the load 254.

In one embodiment, the control block 220 includes an amplifier, such as an operational transconductance amplifier (OTA) 232. The OTA 232 compares the voltage $V_2$ with a threshold 272, and controls an amount of the power from the power source $V_{IN}$ to the battery 252 based on the voltage $V_2$ and the threshold 272. The OTA 232 is coupled to a current source $I_S$. In one embodiment, the threshold 272 is less than the first threshold 270.

When the voltage $V_2$ indicative of the current $I_1$ is less than the threshold 272, the control block 220 is enabled since the voltage $V_2$ is less than the first threshold 270. In this instance, the output of the OTA 232 does not affect the current signal 264.

When the power demand of the load 254 increases, the voltage $V_2$ indicative of the current $I_1$ increases accordingly. When the voltage $V_2$ is greater than the threshold 272 but less than the first threshold 270, the current signal 264 varies according to a difference between the voltage $V_2$ and the threshold 272. In other words, the OTA 232 sinks current from the current source $I_S$ when the voltage $V_2$ is greater than the threshold 272. Therefore, the current signal 264 indicates an amount that the voltage $V_2$ exceeds the threshold 272. In one embodiment, the higher the voltage $V_2$, the less the current signal 264 will be. Thus, the amount of the power from the power source $V_{IN}$ to the battery 252 can be controlled based on the difference between the voltage $V_2$ and the threshold 272 when the voltage $V_2$ is greater than the threshold 272 but less than the first threshold 270.

In one embodiment, the control block 220 further includes a second amplifier 236 that compares the battery voltage $V_{BAT}$ to a voltage threshold $V_{TH1}$. When the battery voltage $V_{BAT}$ is less than the voltage threshold $V_{TH1}$, the output of the amplifier 236 does not affect the current signal 264. When the voltage $V_{BAT}$ is greater than the voltage threshold $V_{TH1}$, the current signal 264 varies according to a difference between the voltage $V_{BAT}$ and the voltage threshold $V_{TH1}$. In other words, the amplifier 236 sinks current from the current source $I_S$ when the voltage $V_{BAT}$ is greater than the voltage threshold $V_{TH1}$. Thus, the amount of the power from the power source $V_{IN}$ to the battery 252 can be controlled based on the difference between the battery voltage $V_{BAT}$ and the voltage threshold $V_{TH1}$ when the battery voltage $V_{BAT}$ exceeds the voltage threshold $V_{TH1}$, in one embodiment.

In one embodiment, the control block 220 further includes a third amplifier 238 that compares a signal $I_A$ indicative of a current $I_3$ from the power source $V_{IN}$ with a current threshold $I_{TH}$. When the signal $I_A$ is less than the current threshold $I_{TH}$, the output of the amplifier 238 does not affect the current signal 264. When the signal $I_A$ is greater than the current threshold $I_{TH}$, the current signal 264 varies according to a difference between the signal $I_A$ and the current threshold $I_{TH}$. In other words, the amplifier 238 sinks current from the current source $I_s$ when the signal $I_A$ is greater than the current threshold $I_{TH}$. Thus, the amount of the power from the power source $V_{IN}$ to the battery 252 can be controlled based on the difference between the current $I_A$ and the threshold $I_{TH}$ when the signal $I_A$ is greater than the current threshold $I_{TH}$, in one embodiment.

In one embodiment, the outputs of the OTA 232, the second amplifier 236 and the third amplifier 238 are coupled to a common node. The current signal 264 is generated based on the outputs of the OTA 232, the second amplifier 236, and the third amplifier 238. In one embodiment, the current signal 264 is determined by an output of the OTA 234, or output of the amplifier 236, or output of the amplifier 238, whichever is first generated.

In the first mode, the control signal 262 varies corresponding to the current signal 264. In one embodiment, when the power demand of the load 254 increases and the current $I_1$ increases accordingly, the controller 206 controls the converter 282 to decrease an amount of the power delivered from the power source $V_{IN}$ to the battery 252, based on the control signal 262.

In one embodiment, if the current $I_1$ keeps increasing and reaches the first threshold 270, the current signal 264 is decreased to substantially zero. The converter 282 stops delivering power from the power source $V_{IN}$ to the battery 252 based on the control signal 262, in one embodiment. As described above, when the current $I_1$ is greater than the first threshold 270, the control block 220 is disabled and the control block 222 is enabled.

In one embodiment, when the control block 222 is enabled, the resistor 268 converts a current signal 266 generated by the control block 222 to the control signal 262 to control the converter 282. The mode signal 260 controls the converter 282 to operate in the second mode. In the second mode, the battery 252 powers the load 254. Meanwhile, the power source $V_{IN}$ can also power the load 254.

In one embodiment, the control block 222 includes an amplifier, such as an OTA 234. The OTA 234 compares the voltage $V_2$ with a threshold 274 and controls an amount of the power provided by the battery 252 to the load 254 based on the voltage $V_2$ and the threshold 274. Similar to the OTA 232, the OTA 234 is coupled to the current source $I_s$. In one embodiment, the threshold 274 is greater than the first threshold 270.

When the voltage $V_2$ indicative of the current $I_1$ is greater than the first threshold 270, the control block 222 is enabled. In this instance, the controller 206 controls the converter 282 to provide the power from the battery 252 to the load 254. Meanwhile, the power source $V_{IN}$ also provides power to the load 254. By providing the extra current from the battery 252, the current $I_1$ flowing through the switch 202 can be maintained below the predetermined threshold.

Similarly, the current signal 264 and the control signal 262 can vary according to a difference between the voltage $V_2$ and the threshold 274. In one embodiment, the higher the voltage $V_2$, the larger the current signal 266 will be. Consequently, the amount of power provided from the battery 252 to the load 254 is adjusted through the converter 282 based on the difference between the voltage $V_2$ and the threshold 274 when the voltage $V_2$ is less than the threshold 274 but greater than the first threshold 270.

In one embodiment, the control block further includes a fourth amplifier 240 that compares a voltage of output node $V_{SYS}$ to a voltage threshold $V_{TH2}$. When the voltage of output node $V_{SYS}$ is greater than the voltage threshold $V_{TH2}$, the output of the fourth amplifier 240 does not affect the current signal 266. When the voltage of output node $V_{SYS}$ is less than the voltage threshold $V_{TH2}$, the current signal 266 varies according to a difference between the voltage of output node $V_{SYS}$ and the voltage threshold $V_{TH2}$. In other words, the fourth amplifier 240 sinks current from the current source $I_S$ when the voltage of output node $V_{SYS}$ is less than the voltage threshold $V_{TH2}$. Thus, the amount of the power from the power source $V_{IN}$ to the battery 252 can be controlled based on the difference between the voltage of output node $V_{SYS}$ and the voltage threshold $V_{TH2}$ when the voltage of output node $V_{SYS}$ is less than the voltage threshold $V_{TH2}$, in one embodiment.

In one embodiment, the outputs of the OTA 234 and the fourth amplifier 240 are coupled to a common node. The current signal 266 is generated based on the outputs of the OTA 234 and the fourth amplifier 240. In one embodiment, the current signal 266 is determined by an output of the OTA 234 or output of the amplifier 240, whichever is first generated.

In one embodiment, the converter 282 includes converter switches 212 and 214, an inductor 216, and a capacitor 218. The converter switch 212 is coupled to the switch 202 and the output node $V_{SYS}$, and the converter switch 214 is coupled to the converter switch 212. The converter switches 212 and 214 are controlled by the controller 206 to operate in the first mode or the second mode. More specifically, the converter switches 212 and 214 converts between a first voltage level of the power source $V_{IN}$, e.g., the voltage of the power source $V_{IN}$, and a second voltage level of the battery 252, e.g., the battery voltage $V_{BAT}$.

In the first mode, the mode signal 260 enables the control block 220, and the controller 206 receives the control signal 262 to control the converter 282 to deliver power from the power source $V_{IN}$ to the battery 252. More specifically, the controller 206 enables the converter switches 212 and 214 alternately to convert the voltage at the output node $V_{SYS}$ to a battery charging voltage $V_{BAT}$.

In one embodiment, the converter 282 operates as a charger (e.g., a buck converter) in the first mode. As such, when the controller 206 enables the switch 212 and disables the switch 214, the power source $V_{IN}$ stores energy in the inductor 216 and charges the battery 252. When the controller 206 disables the switch 212 and enables the switch 214, the energy stored in the inductor 216 continues to provide charging current to the battery 252. As such, a step-down voltage is generated to charge the battery 252.

Similarly, In the second mode, the mode signal 260 enables the control block 222, and the controller 206 receives the control signal 262 to control the converter 282 to provide power from the battery 252 to the load 254. More specifically, the controller 206 enables the converter switches 212 and 214 alternately to convert the battery voltage $V_{BAT}$ to a voltage at the output node $V_{SYS}$.

In one embodiment, the converter 282 operates as a boost converter in the second mode. When the controller 206 disables the converter switch 212 and enables the converter switch 214, the battery 252 stores energy in the inductor 216. When the controller 206 enables the converter switch 212 and disables the converter switch 214, the energy stored in the inductor 216 is provided to the load 254 via the output node $V_{SYS}$. As such, a step-up voltage at the output node $V_{SYS}$ is generated to power the load 254. In an alternative embodiment, the converter 282 operates as a buck converter in the second mode to provide a step-down voltage at the output node $V_{SYS}$ to power the load 254.

As such, the converter switches 212 and 214 can be used to convert the voltage from the power source $V_{IN}$ to a battery charging voltage to charge the battery 252 or convert the battery voltage $V_{BAT}$ to a proper voltage to power the load 254. In one embodiment, the controller 206 controls the converter switches 212 and 214 by a pulse width modulation signal based on the control signal 262.

Figure 3:
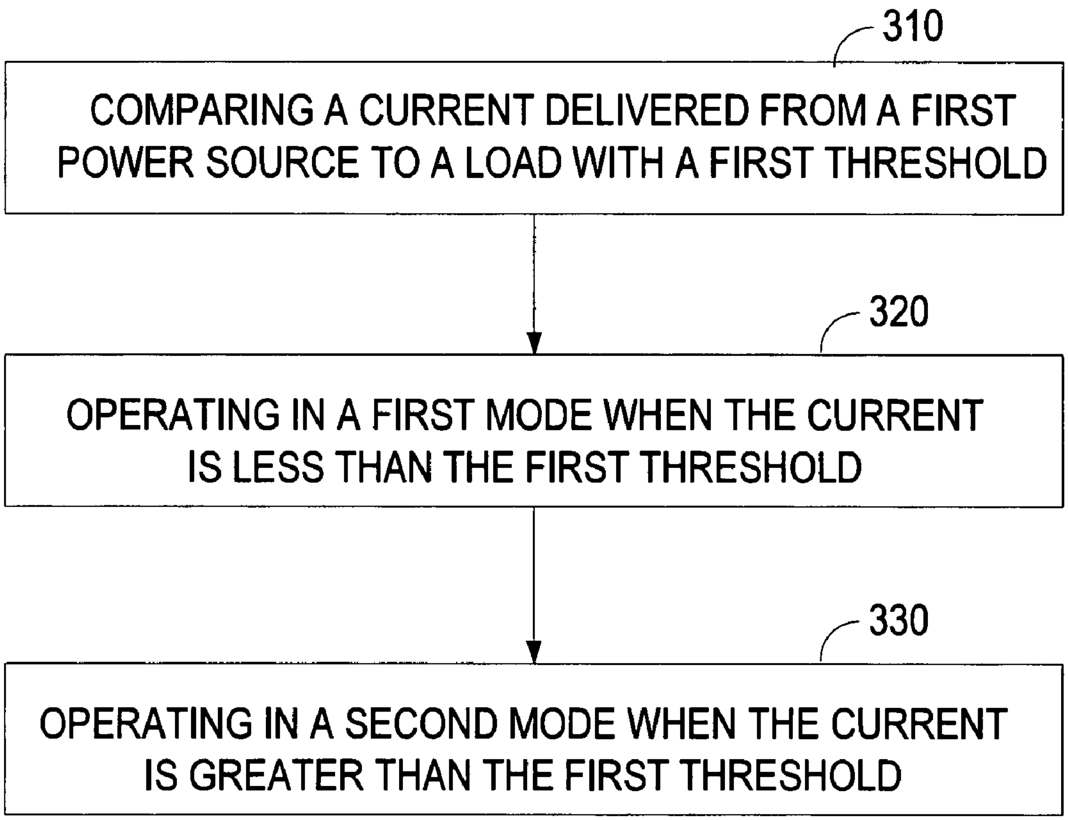
FIG. 3 shows a flowchart of a method for powering a load, in accordance with one embodiment of the present invention.

FIG. 3 is a flowchart 300 of a method for powering a load. Although specific steps are disclosed in FIG. 3, such steps are exemplary. That is, the present invention is well suited to performing various other steps or variations of the steps recited in FIG. 3. FIG. 3 is described in combination with FIG. 2.

In block 310, a voltage $V_2$ indicative of a current $I_1$ delivered from a power source $V_{IN}$ to a load 254 is compared with a threshold 270.

In block 320, the converter 282 operates in a first mode when the voltage $V_2$ is less than the first threshold 270. In the first mode, the power source $V_{IN}$ provides power to charge a second power source, e.g., a battery 252. In one embodiment, the voltage $V_2$ is compared to a threshold 272 in the first mode, and an amount of the power provided from the power source $V_{IN}$ to the battery 252 is decreased when the voltage $V_2$ is greater than the threshold 272. Converter switches 212 and 214 can be controlled to adjust the amount of the power provided from the power source $V_{IN}$ to the battery 252, in one embodiment.

In block 330, the converter operates in a second mode when the voltage $V_2$ is greater than the first threshold 270. In the second mode, the battery 252 provides power to the load 254. In one embodiment, the voltage $V_2$ is compared to a threshold 274 in the second mode, and an amount of the power provided from the battery 252 to the load 254 is increased when the voltage $V_2$ is greater than the threshold 274. Converter switches 212 and 214 can be controlled to adjust the amount of the power provided from the battery 252 to the load 254, in one embodiment. As the battery 252 also provides power to the load 254 in the second mode, the current $I_1$ delivered from a power source $V_{IN}$ to a load 254 can be maintained below an upper current limit.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A system, comprising:

a power bus operable for delivering a first power from a first power source to an output node; and a circuit coupled to said power bus and said output node and operable for monitoring a current flowing through said power bus, wherein said circuit comprises:

a current control block coupled to said power bus operable for comparing said current with a first threshold, wherein said current control block further comprises a first amplifier operable for comparing said current with a second threshold and for generating a first current signal indicating a first difference between said current and said second threshold, wherein said circuit is operable for providing a second power from a second power source to said output node based on said current and said first threshold, and the amount of said second power is adjusted based on said first current signal, and wherein said first amplifier sinks a first source current from a first current control power source at the output of said first amplifier for modifying said first current signal when said current is greater than said first threshold but less than said second threshold.

2. The system of claim 1, wherein said circuit further comprises:

a converter coupled to said current control block and said output node, and operable for providing said second power in addition to said first power to said output node based on a result of said comparing between said current and said first threshold.

3. The system of claim 1, wherein said circuit further comprises a controller operable for receiving said first current signal and for adjusting the amount of said second power according to said first current signal.

4. The system of claim 1, wherein said circuit further comprises:

a converter coupled to said current control block and said output node, and operable for receiving said first power from said first power source to charge said second power source based on a result of said comparing between said current and said first threshold.

5. The system of claim 4, wherein said current control block comprises a second amplifier operable for comparing said current with a third threshold and for generating a second current signal indicating a second difference between said current and said third threshold, wherein the amount of said first power is adjusted through said converter based on said second current signal.

6. The system of claim 5, wherein said second amplifier sinks a second source current from a second current control power source for providing said second current signal when said current is greater than said third threshold but less than said first threshold.

7. The system of claim 2, wherein said converter comprises:

a first converter switch coupled to said power bus and said output node;

a second converter switch coupled to said first switch; and a controller operable for controlling said first converter switch and said second converter switch based on said result.

8. The system of claim 7, wherein said controller controls said first converter switch and said second converter switch by a pulse width modulation signal.

9. A power system, comprising:

a switch operable for enabling and disabling power supplied from a first power source to a load; and a circuit coupled to said first power source, said load and said switch, and operable for regulating a current flowing through said switch, wherein said circuit comprises:

a current control block coupled to said switch operable for comparing said current with a first threshold, wherein said current control block further comprises a first amplifier operable for comparing said current with a second threshold and for generating a first current signal indicating a first difference between said current and said second threshold, wherein said circuit is operable for providing a first power from said first power source to said load and a second power source based on said current and said first threshold, and the amount of said first power is adjusted based on said first current signal, and wherein said first amplifier sinks a first source current from a first current control power source at the output of said first amplifier for modifying said first current signal when said current is greater than said second threshold but less than said first threshold.

10. The power system of claim 9, wherein said circuit further comprises a controller operable for receiving said first current signal and for adjusting the amount of said first power.

11. The power system of claim 9, wherein said circuit further comprises:

a converter coupled to said current control block and said output node, and operable for providing said first power to said load and said second power source based on a result of said comparing between said current and said first threshold.

12. The power system of claim 9, wherein said circuit is operable for providing a second power from said second power source to said load based on a result of said comparing between said current and said first threshold.

13. The power system of claim 12, wherein said current control block further comprises a second amplifier operable for comparing said current with a third threshold and for generating a second current signal indicating a second difference between said current and said third threshold, wherein the amount of said second power is adjusted based on said second current signal.

14. The power system of claim 13, wherein said second amplifier is coupled to a second current control power source for providing said second current signal.

15. The power system of claim 14, wherein said second amplifier sinks a second source current from said second current control power source when said current is greater than said first threshold but less than said third threshold.

16. A method for powering a load, comprising:

comparing a current delivered from a first power source to said load with a first threshold;

operating in a first mode when said current is less than said first threshold, wherein said first power source provides a first power to a second power source and said load in said first mode;

comparing said current with a second threshold by a first amplifier and generating a first current signal indicating a first difference between said current and said second threshold, wherein the amount of said first power is adjusted through a converter based on said first current signal;

sinking a first source current from a first current control power source at the output of said first amplifier for modifying said first current signal when said current is greater than said second threshold but less than said first threshold;

operating in a second mode when said current is greater than said first threshold, wherein said second power source provides a second power to said load in addition to said power from said first power source in said second mode;

comparing said current with a third threshold by a second amplifier and generating a second current signal indicating a second difference between said current and said third threshold, wherein the amount of said second power is adjusted through said converter based on said second current signal; and sinking a second source current from a second current control power source at the output of said second amplifier for modifying said second current signal when said current is greater than said first threshold but less than said third threshold.

17. The method of claim 16, further comprising:

receiving said first current signal and adjusting the amount of said first power.

18. The method of claim 16, further comprising:

receiving said second current signal and for adjusting the amount of said second power.

* * * * *